(12) United States Patent
Ziegler et al.

(10) Patent No.: US 9,715,022 B2
(45) Date of Patent: Jul. 25, 2017

(54) SCINTILLATION DETECTOR PACKAGE HAVING RADIOACTIVE SUPPORT APPARATUS

(71) Applicant: Schlumberger Technology Corporation, Sugar Land, TX (US)

(72) Inventors: Wolfgang Ziegler, Hightstown, NJ (US); Christian Stoller, Princeton Junction, NJ (US); Kenneth E. Stephenson, Plainsboro, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 13/895,130

(22) Filed: May 15, 2013

(65) Prior Publication Data

US 2014/0339408 A1 Nov. 20, 2014

(51) Int. Cl.
*G01V 5/00* (2006.01)
*G01T 1/40* (2006.01)
*G01T 1/20* (2006.01)

(52) U.S. Cl.
CPC . *G01T 1/40* (2013.01); *G01T 1/20* (2013.01)

(58) Field of Classification Search
CPC .................................. G01V 5/06; G01T 1/202
USPC ........................................................ 250/256
See application file for complete search history.

(56) References Cited

U.S. PATENT DOCUMENTS

| | | | |
|---|---|---|---|
| 3,030,509 A | 4/1962 | Carlson | |
| 3,860,823 A | 1/1975 | Luitwieler, Jr. et al. | |
| 3,898,463 A | 8/1975 | Noakes | |
| 4,004,151 A | 1/1977 | Novak | |
| 4,066,908 A | 1/1978 | Farukhi et al. | |
| 4,085,323 A * | 4/1978 | Turcotte et al. | 250/252.1 |
| 4,267,446 A | 5/1981 | Brown et al. | |
| 4,297,574 A | 10/1981 | Card et al. | |
| 4,450,354 A | 5/1984 | Smith et al. | |
| 4,717,825 A * | 1/1988 | Smith et al. | 250/256 |
| 4,772,792 A * | 9/1988 | Utts et al. | 250/366 |

(Continued)

FOREIGN PATENT DOCUMENTS

| | | |
|---|---|---|
| EP | 189645 A1 | 8/1986 |
| WO | 2008088386 A2 | 7/2008 |

(Continued)

OTHER PUBLICATIONS

Norman, et al., "Improved Limit on the Electron Capture Decay Branch of 176 Lu", Department of Energy's Information Bridge: DOE Scientific and Technical Information, http://www.osti.gov/bridge/purl.cover.jsp?purl=/833704-oxbecO/native/833704.pdf, Sep. 11, 2003, pp. 1-9.

(Continued)

*Primary Examiner* — David Porta
*Assistant Examiner* — Hugh H. Maupin
(74) *Attorney, Agent, or Firm* — Michael Dae

(57) ABSTRACT

A radiation detector package includes a support apparatus at least part of which is constructed from a naturally occurring radioactive material. A scintillator is associated with the support apparatus. The support may include a detector housing carrying a photodetector and the scintillator, and the detector housing may be constructed from the naturally occurring radioactive material.

26 Claims, 8 Drawing Sheets

(56) References Cited

U.S. PATENT DOCUMENTS

| | | | |
|---|---|---|---|
| 4,879,463 A * | 11/1989 | Wraight | G01V 5/12 250/254 |
| 5,481,114 A | 1/1996 | Daniel et al. | |
| 5,796,109 A | 8/1998 | Frederick et al. | |
| 5,962,855 A | 10/1999 | Frederick et al. | |
| 6,224,984 B1 | 5/2001 | Furutani et al. | |
| 6,355,932 B1 | 3/2002 | Frederick | |
| 6,359,282 B1 | 3/2002 | Sekela | |
| 7,170,061 B2 | 1/2007 | Clarke et al. | |
| 7,247,853 B2 | 7/2007 | Frederick et al. | |
| 7,274,023 B2 | 9/2007 | Clarke et al. | |
| 7,342,231 B2 | 3/2008 | Warburton et al. | |
| 7,485,865 B2 | 2/2009 | Medley et al. | |
| 7,507,969 B1 | 3/2009 | Jones et al. | |
| 7,629,584 B2 | 12/2009 | Mormann et al. | |
| 7,960,687 B1 | 6/2011 | Simon et al. | |
| 8,013,607 B2 | 9/2011 | DeMeester et al. | |
| 8,530,847 B2 | 9/2013 | Frank | |
| 8,604,416 B2 | 12/2013 | Fruehauf | |
| 8,624,176 B2 | 1/2014 | Bush | |
| 8,785,841 B1 | 7/2014 | Stephenson et al. | |
| 2002/0056809 A1 | 5/2002 | Frederick et al. | |
| 2006/0027759 A1 | 2/2006 | Jiang et al. | |
| 2007/0012879 A1 * | 1/2007 | Testardi | 250/361 R |
| 2009/0127449 A1 * | 5/2009 | Iwatschenko-Borho | 250/252.1 |
| 2009/0261257 A1 | 10/2009 | Menge | |
| 2009/0261263 A1 | 10/2009 | Menge et al. | |
| 2010/0176286 A1 | 7/2010 | Duraj | |
| 2010/0301198 A1 | 12/2010 | Berheide et al. | |
| 2011/0029246 A1 | 2/2011 | Nikitin et al. | |
| 2011/0031405 A1 * | 2/2011 | Kulik et al. | 250/362 |
| 2012/0228472 A1 | 9/2012 | Simonetti et al. | |
| 2012/0267519 A1 | 10/2012 | Nikitin et al. | |
| 2013/0134304 A1 * | 5/2013 | Beekman et al. | 250/269.6 |
| 2014/0084168 A1 * | 3/2014 | Duraj | 250/362 |
| 2014/0339409 A1 | 11/2014 | Stephenson et al. | |

FOREIGN PATENT DOCUMENTS

| | | |
|---|---|---|
| WO | 2010053818 A2 | 5/2010 |
| WO | 2012012101 A2 | 1/2012 |

OTHER PUBLICATIONS

Firestone, et al., "Table of Isotopes, 8th Edition", John Wiley & Sons, Inc., Jul. 19, 1999, p. 2096.

International Search Report and the Written Opinion for International Application No. PCT/US2014/038162 dated Sep. 18, 2014.

International Search Report and the Written Opinion for International Application No. PCT/US2014/038212 dated Jul. 29, 2014.

International Search Report and Written Opinion issued in related PCT application PCT/US2014/038111 on Feb. 11, 2015, 15 pages.

Firestone, "Table of Isotopes, 8th Edition", John Wiley & Sons, 1996, pp. 2094-2097.

* cited by examiner

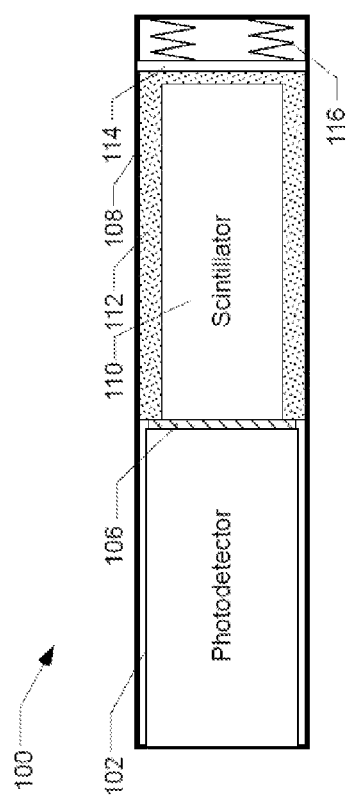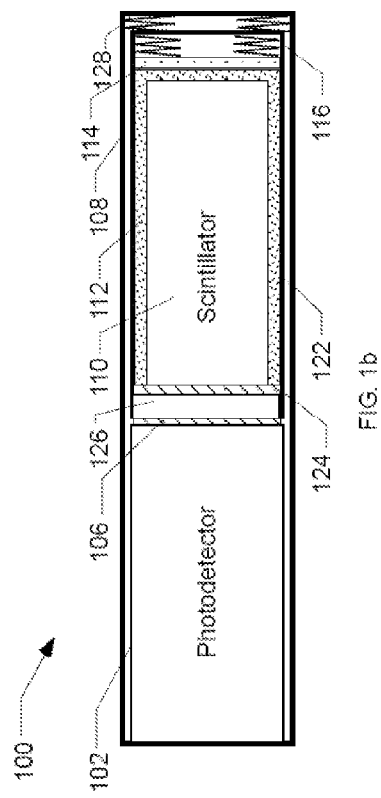

SCINTILLATION DETECTOR PACKAGE HAVING RADIOACTIVE SUPPORT APPARATUS

FIELD OF THE DISCLOSURE

This disclosure related to the field of scintillators, and, more particularly, to scintillators that may be used in well logging or other applications.

BACKGROUND

Radiation detectors, such as gamma-ray or x-ray detectors, for example, often use a scintillator material which converts energy deposited by a given type of radiation (e.g., gamma-rays or x-rays) into light. The light is directed to a photodetector, which converts the light generated by the scintillator into an electrical signal, which may be used to measure the amount of radiation which is deposited in the crystal.

In the case of well-logging tools for hydrocarbon wells (e.g., gas and oil wells), a borehole radiation detector may be incorporated into the tool string to measure radiation from the geological formation surrounding the borehole to determine information about the geological formation, including the location of gas and oil. The measured radiation may be naturally occurring radiation emanating from the materials in and around the hydrocarbon well, or may be radiation emanating from the materials in and around the hydrocarbon well as a result of interactions with radiation (e.g. neutrons, gamma-rays, or x-rays) radiated into the hydrocarbon well by the well-logging tool.

In some applications, it may be useful to gain stabilize a radiation detector. As such, new developments in the area of radiation detectors and ways to gain stabilize them are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation detector package may include a support apparatus at least part of which comprises a naturally occurring radioactive material, and a scintillator associated with the support apparatus.

A method apparatus is directed to a method of logging a formation having a borehole therein. The method may include lowering a well logging instrument into the borehole, and detecting incoming radiation from the formation using a radiation detector package carried by the well logging instrument, the radiation detector package comprising a support apparatus at least part of which comprises a naturally occurring radioactive material, and a scintillator associated with the support apparatus. The method may further include gain stabilizing the radiation detector package based upon detecting scintillations of the scintillator caused by radiation emitted by the naturally occurring radioactive material, using gain stabilization circuitry.

BRIEF DESCRIPTION OF THE DRAWINGS

FIG. 1A is a schematic block diagram of a radiation detector in accordance with the present disclosure including a radioactive reflective material, wherein the scintillator and photodetector share a common housing.

FIG. 1B is a schematic block diagram of a radiation detector in accordance with the present disclosure including a radioactive reflective material, wherein the scintillator has its own housing.

DETAILED DESCRIPTION

Figure 2:
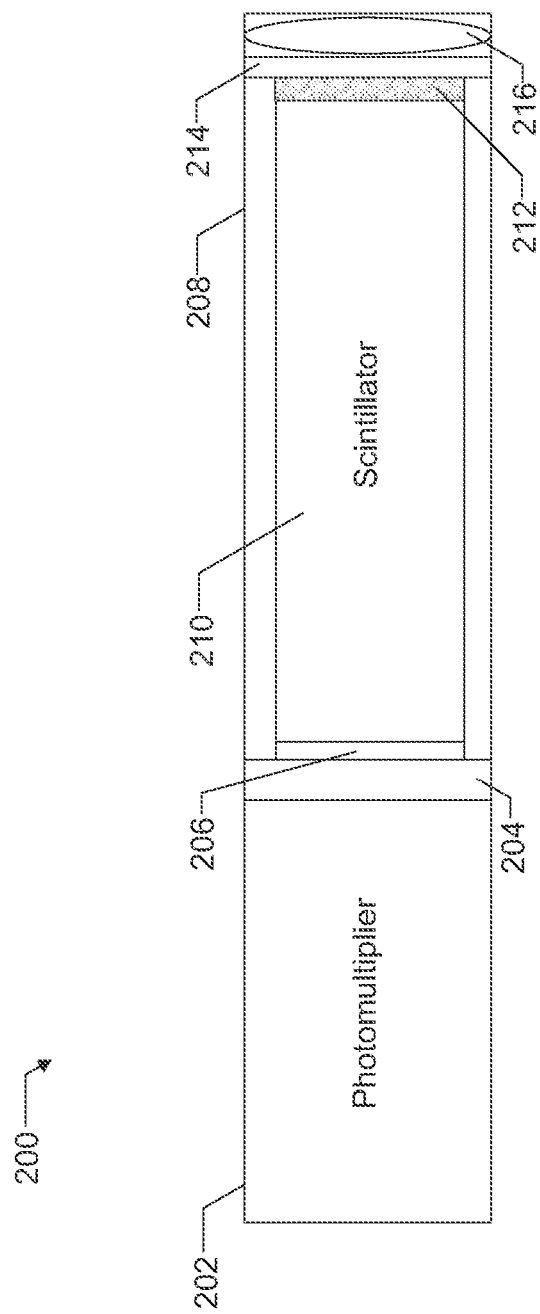
FIG. 2 is a schematic block diagram of a radiation detector in accordance with the present disclosure wherein the radioactive reflective material is at an end of the housing of the radiation detector.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers separated by century refer to like elements throughout, with the exception of those elements shown in FIG. 7.

Referring initially to FIG. 1A, a radiation detector 100 is now described. The radiation detector 100 includes a scintillator 110 coupled to a photodetector 102 through an optical coupler 106 (e.g. a silicon pad, optical grease, etc.). The detector housing 108 in the illustrated example is cylindrical, such as typical for use in a well-logging tool, as will be described further below. The detector housing 108 may comprise a metal (e.g. aluminum, magnesium etc.), or a ceramic, which allows radiation such as gamma rays, x-rays or neutrons to pass through. Alternatively, the housing 108 could be made of a non-metallic material such as a high strength carbon-fiber reinforced polymer. The scintillator 110 is pushed against the photodetector using a spring 116. An optional base plate 114 may be between the scintillator 110 and the spring 116. The photodetector 102 may include a photocathode and a photomultiplier tube, the entrance window (not shown) of which is coupled to the scintillation crystal with the optical coupler 106. It should be noted that other suitable photodetector 102 configurations may be used in some applications, such as an avalanche photodiode (APD) configuration, or silicon photomultiplier configuration, for example.

The detector housing 108, base plate 114, spring 116, or any combination thereof may be constructed at least partly from a naturally occurring radioactive material. For example, they may be constructed entirely from the naturally occurring radioactive material, or may be constructed from a non-radioactive substrate with the naturally occurring radioactive material therein or thereon, or may be constructed from a ceramic with the naturally occurring radioactive material integrated therein. The radioactivity of the naturally occurring radioactive material can be used to gain stabilize the radiation detector 100, as will be explained below in detail.

Alternatively, the scintillator itself may be enclosed in its own housing as shown in FIG. 1B. This is to protect scintillators like NaI(Tl), LaBr$_3$, etc. from deteriorating in the presence of humidity. Here, the scintillator may be hermetically sealed in its housing 122. At one end of the housing 122 the scintillator 110 is coupled to an exit window 126 with an optical coupler 124. On the other end a spring 116 pushes the scintillator 110 against the exit window 126. In turn, the scintillator housing is pushed against the photodetector by a spring 128. There may be an optional base plate between the spring 116 and the scintillator 110.

Similarly to that described above, the housing 122, base plate, spring 116, or any combination thereof may be constructed from a naturally occurring radioactive material. The naturally occurring radioactive material may be lutetium, potassium, thorium, lanthanum or any combinations thereof, with or without other non-radioactive materials included. The naturally occurring radioactive material may be an oxide of the materials listed above, for example Lu$_2$O$_3$ or La$_2$O$_3$. In fact, the naturally occurring radioactive material may include any of the materials listed above as well as oxides thereof.

In addition, the naturally occurring radioactive material may be a metallic substance in solid form, such as one of the listed materials, or a combination thereof. Additionally, the naturally occurring radioactive material may be one or more of the previous listed materials in metallic form alloyed with a non-radioactive metal.

The scintillator 110 may be a plastic scintillator or crystal scintillator, for example. Indeed, various types of scintillator materials may be used for the scintillator 110 depending upon the given application. Example scintillator materials may include: gadolinium oxyorthosilicate (GSO), YAlO$_3$ (YAP), LuYAP, LaCl$_3$(Ce) (lanthanum chloride doped with Cerium), LaBr$_3$(Ce) (Cerium-doped lanthanum bromide), bismuth germanate (BGO), NaI(Tl), LuAG, YAG, LuAP, SrI$_2$, GAGG/GYGaGG, CeBr$_3$, GdI$_2$, LuI$_2$, ceramic scintillators, GPS, LPS, BaBrI, LuAG ceramic, LiCaF, CLYC, CLLB, CLLC, etc.

As noted above, scintillators are widely used in radiation detectors 100 in several research and industrial fields, including the oil industry. The scintillator emits light when struck by ionizing radiation. In a radiation detector 100 configuration, the scintillation light is to be directed towards the photodetector 102, whose function is to convert the light signal into an electrical signal. The electrical signal may be amplified by an amplifier(s), which may provide an amplified signal to a signal processor or processing circuitry. The signal processor may include a general or special-purpose processor, such as a microprocessor or field programmable gate array, and associated memory, and may perform a spectroscopic analysis of the electrical signal, for example.

There is a radioactive reflective material 112 between at least a portion of the detector housing (108) or the scintillator package housing 122 and the scintillator 110. The reflective properties of the radioactive reflective material 112 helps improve light transport and direct light emitted by the scintillator into the photodetector 102. The radioactivity of the radioactive reflective material 112 can be used to gain stabilize the radiation detector 100, as will be explained below in detail.

In addition, the exit window 126 may be constructed from a non-scintillating, radioactive material, and may also be used to gain stabilize the radiation detector. This non-scintillating, radioactive material may be naturally occurring, and may comprise lutetium, for example. Indeed, the non-scintillating, radioactive material may be undoped LuAP or undoped LuAG, such as LuAP that is not doped with cerium and LuAG that is not doped with cerium. The exit window could also be made of Lu$_2$O$_3$ ceramic or could be a glass containing potassium, for example. The radioactive reflective material 112 may be in powdered form, and may be a naturally occurring material. It should be noted that the radioactive reflective 112 material may be mixed with a non-radioactive reflective metallic powder, such as aluminum, silver, or a non-metallic powder such as Al$_2$O$_3$, or TiO$_2$. This may be done to reduce the radioactivity of the radioactive reflective powder and/or its ability to absorb incoming radiation from a formation.

The radioactive reflective material 112 may be any suitable material. Suitable materials are chemically compatible with typical scintillator materials (e.g. not cause degradation of optical parameters during extended periods at high temperature), chemically stable at borehole temperatures, emit radiation such as gamma-rays that form scintillation lines separate from the ones of interest in the measurement (usable for gain stabilization, as will be explained below), and emit sufficient amounts of radiation such that the statistical precision is adequate for gain stabilization but not so much that the material becomes a radiation hazard.

In accordance with this, the radioactive reflective material 112 may comprise (i.e. be partially constituted from) lutetium, potassium, lanthanum, or thorium, and for example may be Lu$_2$O$_3$, KCl, ThO$_2$, LaO, or any mix thereof. Having the radioactive reflective material 112 be a naturally occurring material, as opposed to a material created in a reactor or particle accelerator, can be useful in that the resulting radiation detector 100 may be subject to fewer government regulations. Thus, it should be understood that a naturally occurring material means a material not created in a reactor or particle accelerator, and a material that has not been enriched to increase the fraction of radioactive isotopes therein. Thus, a naturally occurring material is one with its naturally occurring isotopic distribution.

The radioactive reflective material 112 may be adjacent portions of the scintillator 110, or may surround the scintillator as in FIG. 1. Indeed, the radioactive reflective material 112 may be described as circumscribing the scintillator 110 along a longitudinal axis thereof, and as well as an end of the scintillator.

Figure 3:
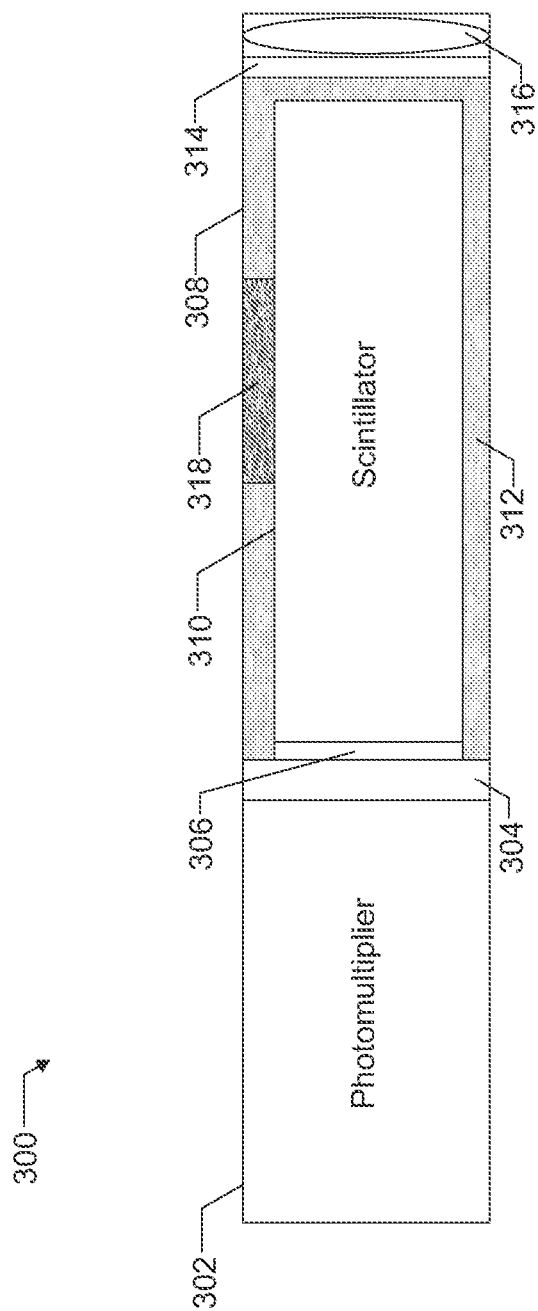
FIG. 3 is a schematic block diagram of radiation detector in accordance with the present disclosure including both a radioactive reflective material and a non-radioactive reflective material.

In some applications, as shown in FIG. 2, the radioactive reflective material 212 is adjacent an end of the scintillator 210 without partially or fully circumscribing the longitudinal axis of the scintillator. In other applications, as shown in FIG. 3, the radioactive reflective material 312 may be adjacent a portion or portions of the scintillator 310, while a non-radioactive reflective material 318 may be adjacent another portion or portions of the scintillator. This may be done to form a "window" to help allow certain energies and types of external incoming radiation to more easily reach the scintillator 310. The radiation detector 310 can be oriented in a well logging instrument such that the "window" faces a direction from which incoming radiation from a formation into which the well logging instrument is inserted is likely to be received. In some such applications, it would be particularly useful if the non-radioactive reflective material 318 has a same reflectance as the radioactive reflective material 312, but attenuates radiation such as gamma rays less than the radioactive reflective material. As another approach, it could also be useful if the non-radioactive reflective material 318 is less dense than the radioactive reflective material 312, so as to help enhance the directionality of the radiation sensitivity of the radiation detector 310.

Figure 4:
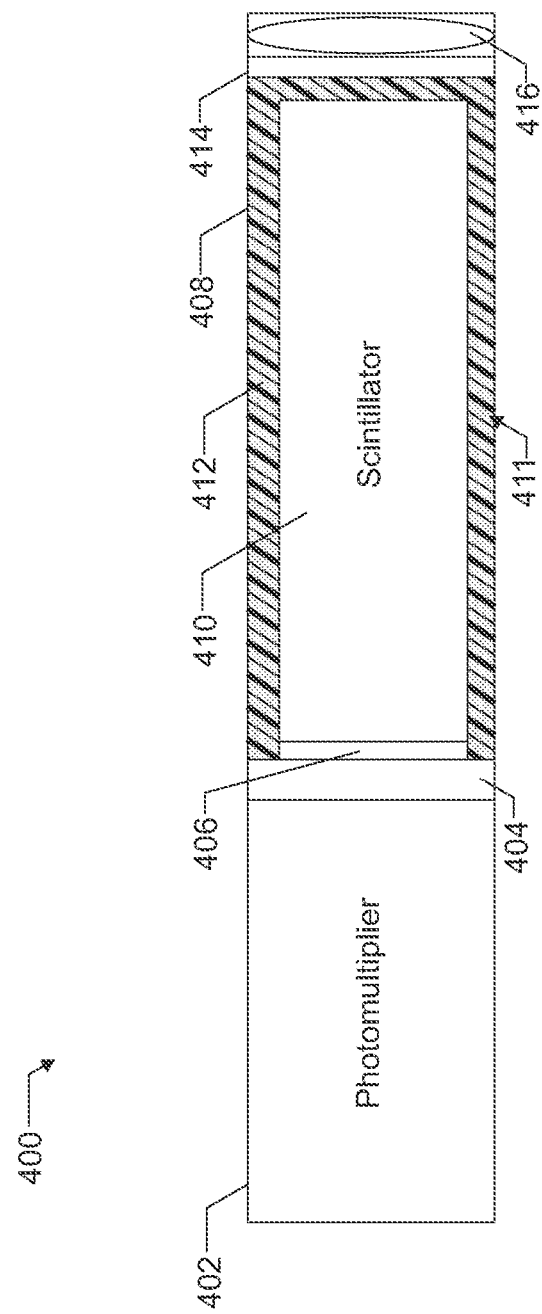
FIG. 4 is a schematic block diagram of radiation detector in accordance with the present disclosure wherein the radioactive reflective material is at least partially embedded in a sleeve surrounding the scintillator.

To help restrict the radioactive reflective material 412 from moving within the scintillator package housing 408, the radioactive reflective material 412 may be completely or incompletely embedded in an elastomer, as shown in FIG. 4.

Figure 5:
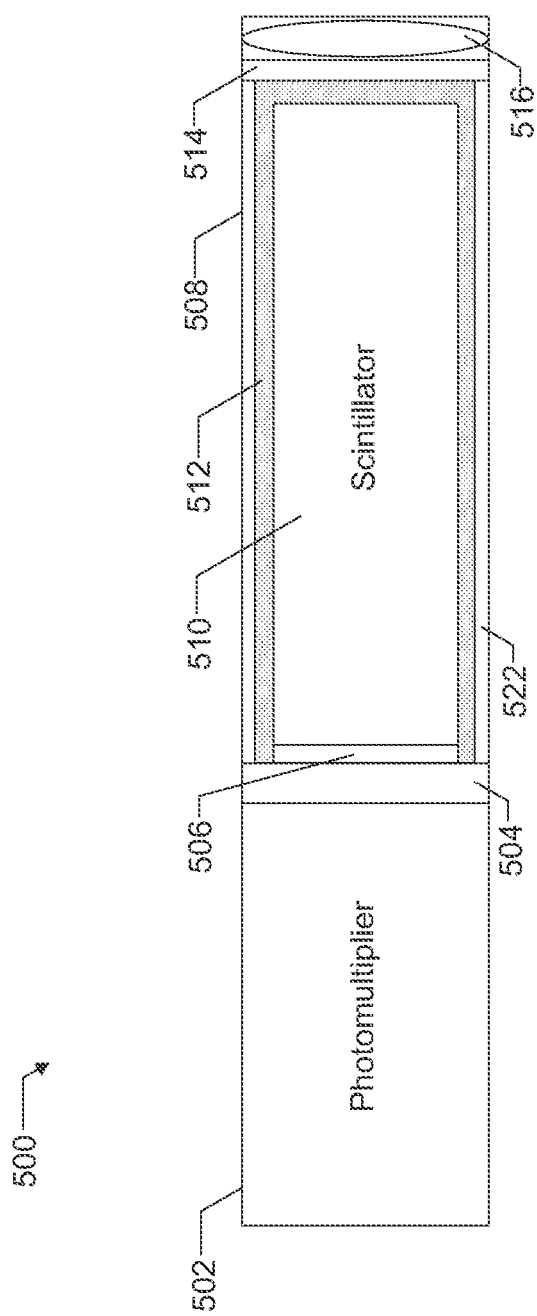
FIG. 5 is a schematic block diagram of radiation detector in accordance with the present disclosure with a non-radioactive reflective material at least partially surrounding the radioactive reflective material.

To help further improve light transport, in some cases, a non-radioactive reflective material 522, such as a reflective elastomer or Teflon, may partially or fully surround the radioactive reflective material 512, as shown in FIG. 5.

Figure 6:
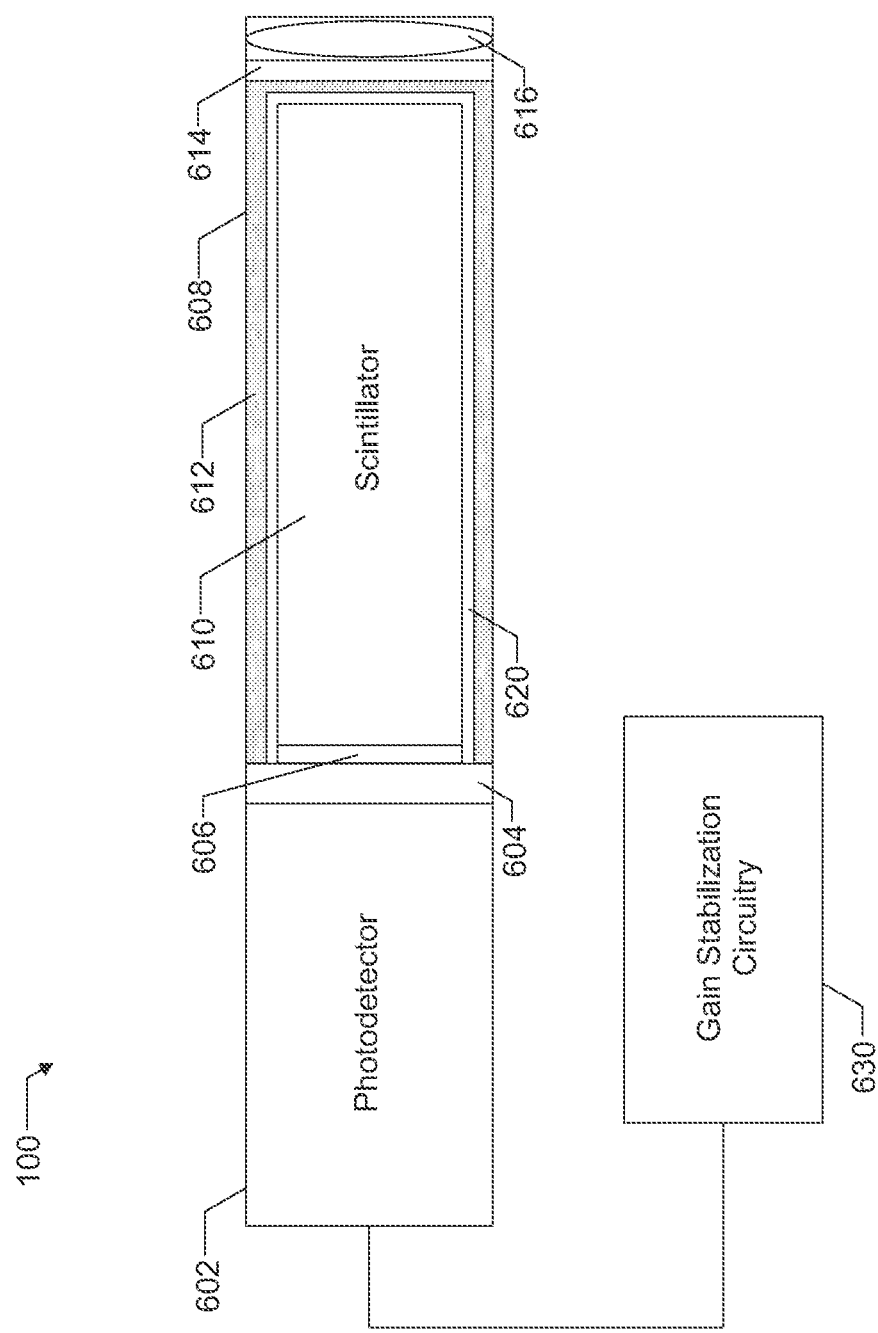
FIG. 6 is a schematic block diagram of radiation detector in accordance with the present disclosure wherein an absorptive layer is between the scintillator and radioactive reflective material.

As will now be explained with reference to FIG. 6, when the radioactive reflective material 612 emits radiation, that radiation may be in the form of alpha, beta, or gamma radiation. To shield the scintillator 610 from undesirable forms of radiation, typically the alpha and beta radiation, there may be an absorptive layer 620 between the radioactive reflective material 612 and the scintillator to absorb the alpha radiation and/or beta radiation. This absorptive layer 620 is optically transparent, and may helpfully have a low index of refraction.

In a typical density measurement using a radiation generator, such as an electronic radiation generator or a radio-isotopic source, the radiation generated by the radiation generator and directed into a formation scatters many times before the byproducts of those scattering interactions reach the radiation detector 600. Thus, the radiation incoming to the radiation detector 600 from the formation may have an energy of less than 300 keV. To gain stabilize the detector 600, a "check" source of radiation that produces radiation having an energy greater than that of the radiation incoming to the radiation detector, but not too much greater, is useful. The radioactive reflective material 612 serves this purpose. When radiation from the radioactive reflective material 612 strikes the scintillator 610, scintillation lines separate from those of interest in making the density measurement are detected. These detected scintillation lines can be used by gain stabilization circuitry 630 to gain stabilize the radiation detector 600.

Figure 7:
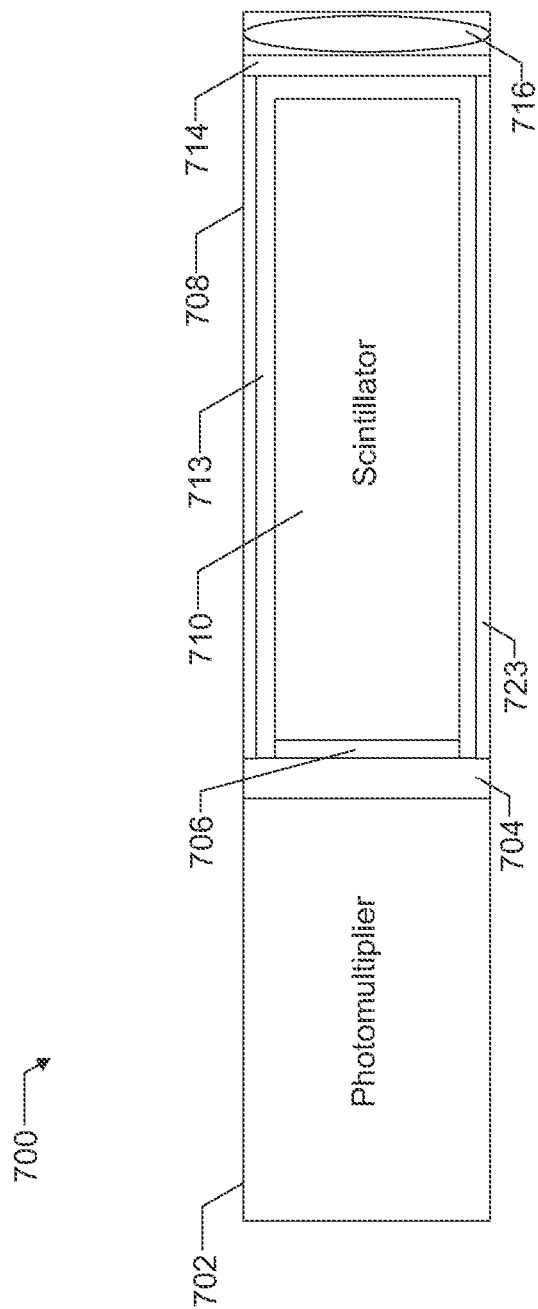
FIG. 7 is a schematic block diagram of a radiation detector in accordance with the present disclosure wherein a naturally occurring radioactive material is between the housing and a reflective material that is adjacent the scintillator.

In an application shown in FIG. 7, there is a non-radioactive reflective material 713 at least partially surrounding the scintillator 710. A naturally occurring radioactive material 723, such as a sleeve, at least partially surrounds the non-radioactive reflective material 713 to urge the non-radioactive reflective material into the scintillator 710. This configuration works for situations where the scintillator 710 has its own housing, as well as for situations where the scintillator and photodetector 702 are in a common housing.

It should be noted that the scintillator packages and radiation detection systems disclosed herein are suitable for uses outside of oilfield applications, for example in the medical, mining, materials inspection, and security fields.

Figure 8:
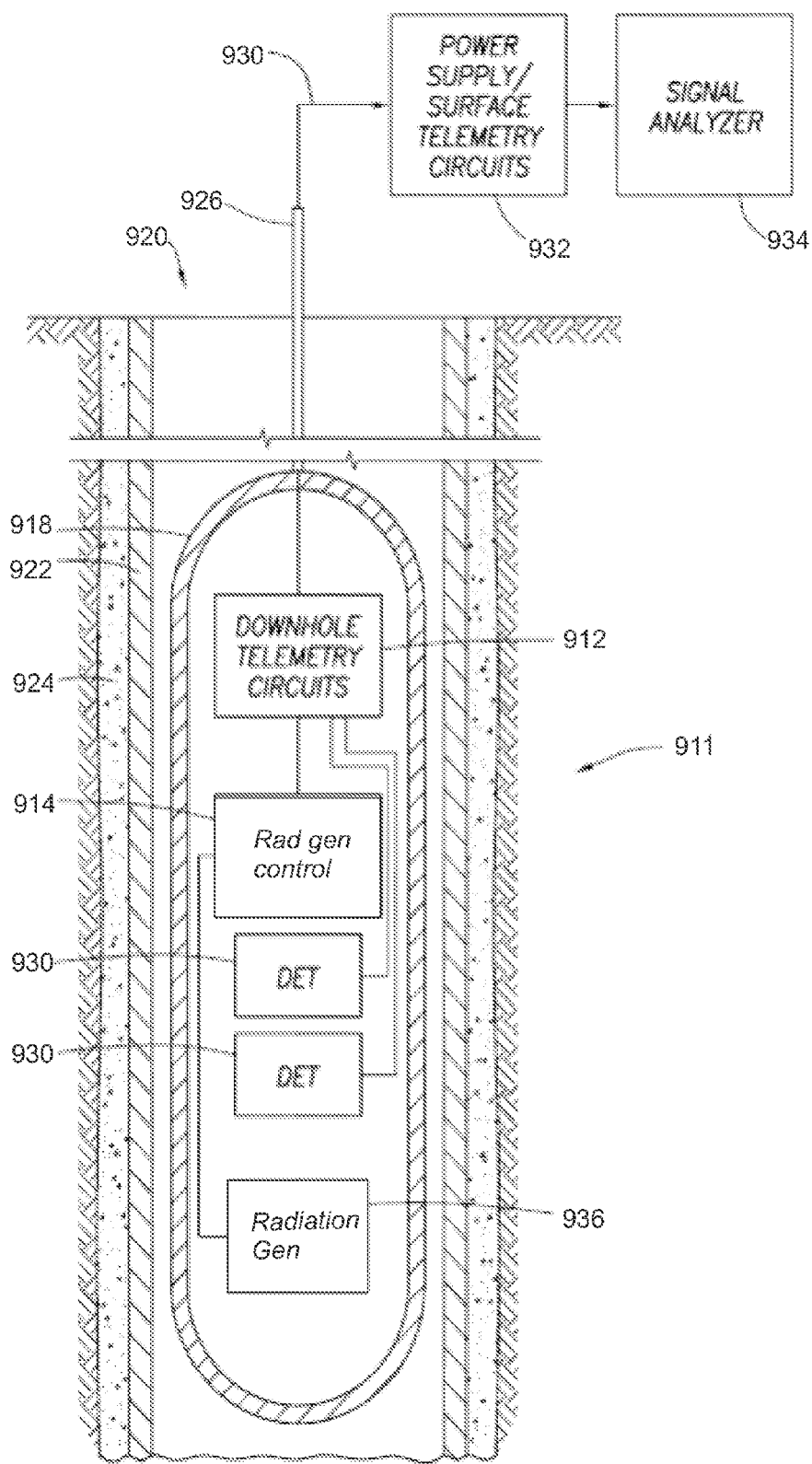
FIG. 8 is a schematic block diagram of a well-logging tool in which the radiation detectors disclosed herein may be used.

Turning now to FIG. 8, an example of a well-logging tool in which one or more radiation detectors 30 (similar to those described above) may be used. The detectors 30 are positioned within a sonde housing 918 along with a radiation generator 936 (e.g., neutron generator, x-ray generator, etc.) and associated high voltage electrical components (e.g., power supply). In some applications, the detectors 30 and radiation generator 936 could be in a pad rather than a sonde. Supporting control circuitry 914 for the radiation generator 936 (e.g., low voltage control components) and other components, such as downhole telemetry circuitry 912, may also be carried in the sonde housing 918.

The sonde housing 918 is to be moved through a borehole 920. In the illustrated example, the borehole 920 is lined with a steel casing 922 and a surrounding cement annulus 924, although the sonde housing and radiation generator 936 may be used with other borehole configurations (e.g., open holes). By way of example, the sonde housing 918 may be suspended in the borehole 920 by a cable 926, although a coiled tubing, etc., may also be used. Furthermore, other modes of conveyance of the sonde housing 918 within the borehole 920 may be used, such as wireline, slickline, Tough Logging Conditions (TLC) systems, and logging while drilling (LWD), for example. The sonde housing 918 may also be deployed for extended or permanent monitoring in some applications.

A multi-conductor power supply cable 930 may be carried by the cable 926 to provide electrical power from the surface (from power supply circuitry 932) downhole to the sonde housing 918 and the electrical components therein (i.e., the downhole telemetry circuitry 912, low-voltage radiation generator support circuitry 914, and one or more of the above-described radiation detectors 30). However, in other configurations power may be supplied by batteries and/or a downhole power generator, for example.

The radiation generator 936 is operated to emit x-rays or other radiation to irradiate the geological formation adjacent the sonde housing 918. X-rays or other radiation that returns from the formation are detected by the radiation detectors 30. The outputs of the radiation detectors 30 are communicated to the surface via the downhole telemetry circuitry 912 and the surface telemetry circuitry 932 and may be analyzed by a signal analyzer 934 to obtain information regarding the geological formation. By way of example, the signal analyzer 934 may be implemented by a computer system executing signal analysis software for obtaining information regarding the formation. More particularly, oil, gas, water and other elements of the geological formation have distinctive radiation signatures that permit identification of these elements. Signal analysis can also be carried out downhole within the sonde housing 918 in some embodiments.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A radiation detector package for detecting first radiation incoming from outside of the radiation detector package and second radiation from a naturally occurring radioactive material from within the radiation detector package, the radiation detector package comprising:
    a support apparatus at least part of which comprises the naturally occurring radioactive material;
    a scintillator at least partially supported in position by the support apparatus, wherein the support apparatus and the scintillator are configured to enable the scintillator to detect both the first radiation incoming from outside of the radiation detector package and the second radiation from the naturally occurring radioactive material from within the radiation detector package, wherein said support apparatus is configured to enable the radiation detector package to sustain downhole drilling or logging operations;
a photodetector optically connected with the scintillator; and
a gain stabilization circuitry communicatively connected with the photodetector, wherein the gain stabilization circuitry is operable to gain stabilize the radiation detector package based on signals caused by the second radiation detected by the scintillator.

2. The radiation detector package of claim 1, wherein the support apparatus comprises a detector housing carrying the photodetector and the scintillator; and wherein the detector housing comprises the naturally occurring radioactive material.

3. The radiation detector package of claim 1, wherein the support apparatus comprises a scintillator housing carrying the scintillator, and a detector housing carrying the photodetector and the scintillator housing; and wherein the scintillator housing comprises the naturally occurring radioactive material.

4. The radiation detector package of claim 1, wherein the support apparatus comprises a scintillator housing carrying the scintillator, and a detector housing carrying the photodetector and the scintillator housing; and wherein the detector housing comprises the naturally occurring radioactive material.

5. The radiation detector package of claim 1, wherein the support apparatus comprises:
a scintillator housing carrying the scintillator and having first and second ends;
a detector housing carrying the photodetector and the scintillator housing, the photodetector being adjacent the first end of the scintillator housing;
a base plate in the detector housing and adjacent the second end of the scintillator housing;
a biasing member in the detector housing positioned such that it urges the base plate toward the second end of the scintillator housing, thereby urging the scintillator housing toward the photodetector;
and wherein the base plate comprises the naturally occurring radioactive material.

6. The radiation detector package of claim 1, wherein the support apparatus comprises:
a scintillator housing carrying the scintillator and having first and second ends;
a detector housing carrying the photodetector and the scintillator housing, the photodetector being adjacent the first end of the scintillator housing;
a base plate in the detector housing and adjacent the second end of the scintillator housing;
a biasing member in the detector housing positioned such that it urges the base plate toward the second end of the scintillator housing, thereby urging the scintillator housing toward the photodetector;
and wherein the biasing member comprises the naturally occurring radioactive material.

7. The radiation detector package of claim 1, wherein the support apparatus comprises:
a scintillator housing carrying the scintillator and comprising a transparent window at an end thereof;
a detector housing carrying the photodetector and the scintillator housing;
a base plate in the scintillator housing adjacent the scintillator and opposite the transparent window;
a biasing member in scintillator housing positioned such that it urges the base plate toward the scintillator, thereby urging the scintillator toward the transparent window;
and wherein the base plate comprises the naturally occurring radioactive material.

8. The radiation detector package of claim 1, wherein the support apparatus comprises:
a scintillator housing carrying the scintillator and comprising a transparent window at an end thereof;
a detector housing carrying the photodetector and the scintillator housing;
a base plate in the scintillator housing adjacent the scintillator and opposite the transparent window;
a biasing member in scintillator housing positioned such that it urges the base plate toward the scintillator, thereby urging the scintillator toward the transparent window;
and wherein the biasing member comprises the naturally occurring radioactive material.

9. The radiation detector package of claim 1, wherein the support apparatus comprises:
a detector housing carrying the photodetector and the scintillator;
a base plate in the detector housing adjacent the scintillator and opposite the photodetector;
a biasing member in the detector housing being positioned such that it urges the base plate toward the scintillator, thereby urging the scintillator toward the photodetector;
and wherein the base plate comprises the naturally occurring radioactive material.

10. The radiation detector package of claim 1, wherein the support apparatus comprises:
a detector housing carrying the photodetector and the scintillator;
a base plate in the detector housing adjacent the scintillator and opposite the photodetector;
a biasing member in the detector housing being positioned such that it urges the base plate toward the scintillator, thereby urging the scintillator toward the photodetector;
and wherein the biasing member comprises the naturally occurring radioactive material.

11. The radiation detector package of claim 1 further comprising a housing disposed about the support apparatus and the scintillator, wherein the support apparatus comprises a sleeve between the housing and the scintillator, and wherein the sleeve comprises the naturally occurring radioactive material.

12. The radiation detector package of claim 1, wherein the naturally occurring radioactive material comprises a metallic substance in solid form.

13. The radiation detector package of claim 1, wherein the naturally occurring radioactive material comprises a naturally occurring radioactive metal alloyed with at least one non-radioactive metal.

14. The radiation detector package of claim 1, wherein the naturally occurring radioactive material is integrated in or on a non-radioactive substrate.

15. The radiation detector package of claim 1, wherein the naturally occurring radioactive material is integrated within a ceramic.

16. The radiation detector package of claim 1, wherein the naturally occurring radioactive material comprises at least one radioactive oxide.

17. The radiation detector package of claim 1, wherein the naturally occurring radioactive material comprises $Lu_2O_3$.

18. The radiation detector package of claim 1, wherein the naturally occurring radioactive material comprises lutetium and/or potassium and/or thorium and/or lanthanum or combinations thereof.

19. The radiation detector package of claim 1, wherein the support apparatus comprises a detector housing carrying the photodetector and the scintillator; and comprising a naturally radioactive reflective material between at least a portion of the scintillator and the detector housing.

20. The radiation detector package of claim 19, wherein the naturally occurring radioactive reflective material comprises lutetium and/or potassium and/or thorium and/or lanthanum or combinations thereof.

21. The radiation detector package of claim 1, wherein the support apparatus comprises a detector housing carrying the photodetector and the scintillator, a non-radioactive reflective material between the detector housing and scintillator, and a naturally occurring radioactive material between the detector housing and non-radioactive reflective material.

22. The radiation detector package of claim 1, wherein the support apparatus comprises a scintillator housing carrying the scintillator, and a detector housing carrying the photodetector and the scintillator housing; and wherein the support apparatus comprises a non-radioactive reflective material between the scintillator housing and the scintillator, and a naturally occurring radioactive material between the scintillator housing and the non-radioactive reflective material.

23. The radiation detector package of claim 1, wherein the support apparatus comprises a scintillator housing carrying the scintillator, and a detector housing carrying the photodetector and the scintillator housing; and comprising a naturally radioactive reflective material between at least a portion of the scintillator and the scintillator housing.

24. The radiation detector package of claim 23, wherein the naturally occurring radioactive reflective material comprises lutetium and/or potassium and/or thorium and/or lanthanum or combinations thereof.

25. The radiation detector package of claim 1, wherein the scintillator detects scintillation lines caused by the second radiation from the naturally occurring radioactive material, and wherein the gain stabilization circuitry gain stabilizes the radiation detector package based on the detected scintillation lines.

26. The radiation detector package of claim 1 not comprising another scintillator configured to detect the second radiation from the naturally occurring radioactive material of the support apparatus.

* * * * *